(12) United States Patent
Devine et al.

(10) Patent No.: US 7,947,101 B2
(45) Date of Patent: May 24, 2011

(54) REDUCED ADHESIVE FILTER ASSEMBLY

(75) Inventors: Steven T. Devine, Rockaway, NJ (US); Anders Martin Sundvik, Hägersten (SE); Lennart Karlsson, Täby (SE)

(73) Assignee: Camfil AB, Trosa (SE)

( * ) Notice: Subject to any disclaimer, the term of this patent is extended or adjusted under 35 U.S.C. 154(b) by 1010 days.

(21) Appl. No.: 11/365,326

(22) Filed: Mar. 1, 2006

(65) Prior Publication Data
US 2007/0204577 A1 Sep. 6, 2007

(51) Int. Cl.
*B01D 46/52* (2006.01)

(52) U.S. Cl. ........... 55/484; 55/497; 55/502; 55/521; 55/524

(58) Field of Classification Search ........... 55/482, 55/495, 497, 499, 500, 501, 502, 521, DIG. 31, 55/DIG. 5, 487, 514, 484, 524; 156/330.9, 156/331.1, 331.4, 331.7; 428/195, 198; 442/149
See application file for complete search history.

(56) References Cited

U.S. PATENT DOCUMENTS

| | | | |
|---|---|---|---|
| 3,490,211 A * | 1/1970 | Cartier | 55/487 |
| 4,610,706 A | 9/1986 | Nesher | |
| 4,701,197 A | 10/1987 | Thornton et al. | |
| 5,098,767 A | 3/1992 | Linnersten | |
| 5,106,397 A * | 4/1992 | Jaroszczyk et al. | 96/388 |
| 5,674,303 A * | 10/1997 | Ter Horst | 55/497 |
| 5,779,747 A * | 7/1998 | Schlor et al. | 55/497 |
| 6,074,450 A | 6/2000 | Raber | |
| 6,171,354 B1 * | 1/2001 | Johnson | 55/309 |
| 6,319,300 B1 * | 11/2001 | Chen | 55/497 |
| 6,375,699 B1 * | 4/2002 | Beck | 55/497 |
| 6,447,566 B1 * | 9/2002 | Rivera et al. | 55/482 |
| 6,485,538 B1 * | 11/2002 | Toyoshima | 55/490 |
| 6,602,328 B2 | 8/2003 | Doi et al. | |
| 6,814,773 B2 * | 11/2004 | Shah et al. | 55/497 |
| 6,833,017 B2 * | 12/2004 | Quigley | 55/497 |
| 6,863,959 B2 * | 3/2005 | Welch et al. | 428/195.1 |
| 7,004,989 B2 * | 2/2006 | Karlsson | 55/497 |
| 7,048,501 B2 * | 5/2006 | Katayama et al. | 415/121.2 |
| 7,148,501 B1 | 12/2006 | Kralles et al. | |
| 7,156,898 B2 * | 1/2007 | Jaisinghani | 95/63 |
| 7,255,723 B2 * | 8/2007 | Choi et al. | 55/499 |
| 7,377,963 B2 * | 5/2008 | Tanahashi et al. | 96/135 |
| 7,481,862 B2 * | 1/2009 | Attassery | 55/502 |
| 2002/0119722 A1 * | 8/2002 | Welch et al. | 442/382 |
| 2005/0144916 A1 | 7/2005 | Adamek et al. | |

OTHER PUBLICATIONS

Prosecution history of U.S. Appl. No. 11/365,571 as of May 29, 2009.
Prosecution history of U.S. Appl. No. 11/365,341 as of May 29, 2009.

* cited by examiner

*Primary Examiner* — Duane Smith
*Assistant Examiner* — Minh-Chau Pham
(74) *Attorney, Agent, or Firm* — Patterson & Sheridan, LLP

(57) ABSTRACT

Embodiments of the invention generally include a filter assembly having a media pack having a single web of pleated media having at least two mini-pleated regions arranged in non-linear orientation. In one embodiment, a filter assembly includes a media pack defined by a single web of media, and an adhesive layer coupling a flat end of the media pack to a frame assembly to form a lap joint. In another embodiment, a filter assembly includes a media pack sealed to a frame assembly. A discontinuous layer of adhesive couples at least one edge of the media pack to the frame assembly.

21 Claims, 12 Drawing Sheets

REDUCED ADHESIVE FILTER ASSEMBLY

CROSS-REFERENCE TO RELATED APPLICATIONS

This application is related to U.S. patent application Ser. No. 11/365,571, filed Mar. 1, 2006, entitled "Box-V Filter and Method of Fabricating the Same" by Karlsson, et al. and U.S. patent application Ser. No. 11/365,341, filed Mar. 1, 2006, entitled "Method of Making a Filter Assembly" by Sundvik, et al., both of which are herein incorporated by reference in their entireties.

BACKGROUND OF THE INVENTION

1. Field of the Invention

The embodiments of the present invention relate to an air filter for heating, ventilation and air conditioning (HVAC) systems, and a method for manufacturing the same.

2. Background of the Invention

Heating, ventilation and air conditioning (HVAC) systems typically include at least one particulate air filter for maintaining indoor air quality. Examples of facilities using these types of HVAC systems include office buildings, hospitals and factories, among others. Many systems include banks of medium to high efficiency, or final stage, filters, along with low efficiency pre-filters.

One filter commonly utilized in HVAC applications as a final stage filter is a RIGA-FLO® filter, available from Camfil Farr, Inc., located in Riverdale, N.J. This filter is available in a variety of configurations and meeting American Society of Heating, Refrigerating and Air-Conditioning Engineers (ASHREA) standards. Although RIGA-FLO® filters have demonstrated robust performance and reliability, the commodity nature of HVAC filters reduces a continuous downward pricing pressure from consumers. Thus, it would be desirable to fabricate a filter with similar performance at a reduced production cost in order to satisfy market demands.

Therefore, there is a need for an improved HVAC filter assembly.

SUMMARY OF THE INVENTION

Embodiments of the invention generally include a filter assembly having a media pack having a single web of pleated media having at least two mini-pleated regions arranged in non-linear orientation. In one embodiment, a filter assembly includes a media pack defined by a single web of media, and an adhesive layer coupling a flat end of the media pack to a frame assembly to form a lap joint.

In another embodiment, a filter assembly includes a media pack sealed to a frame assembly. A discontinuous layer of adhesive couples at least one edge of the media pack to the frame assembly. In one embodiment, the discontinuous layer comprises a swirled or sprayed layer of adhesive. In another embodiment, the discontinuous layer comprises a random, a wave or an oscillating pattern of adhesive. In yet another embodiment, the discontinuous layer includes adhesive regions touching and spaced from each other. In yet another embodiment, the discontinuous layer includes a plurality of elongated adhesive strings having regions touching and spaced from each other.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
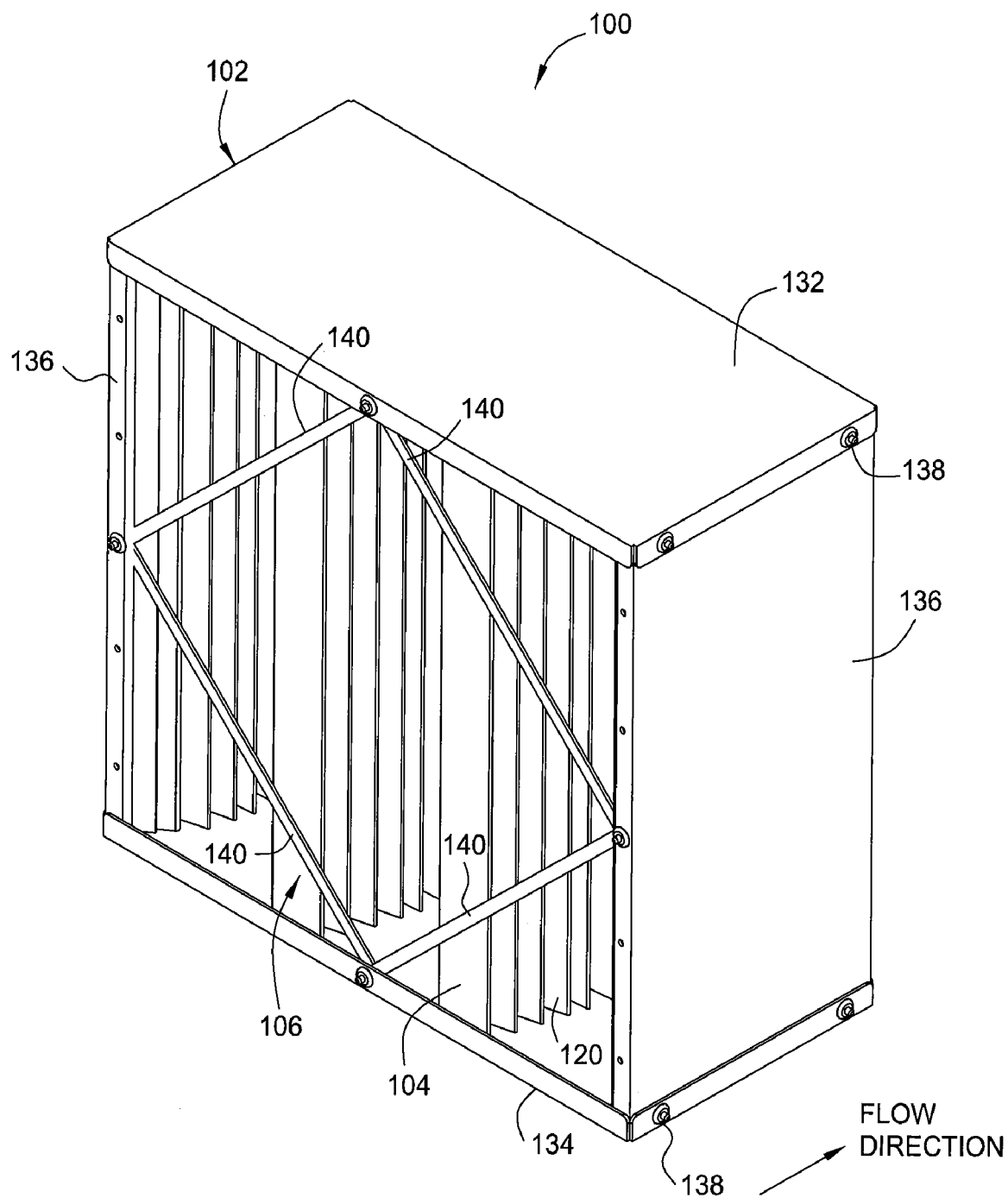
FIGS. 1A-B are front isometric and exploded views of one embodiment of an air filter of the present invention.
Figure 1B:
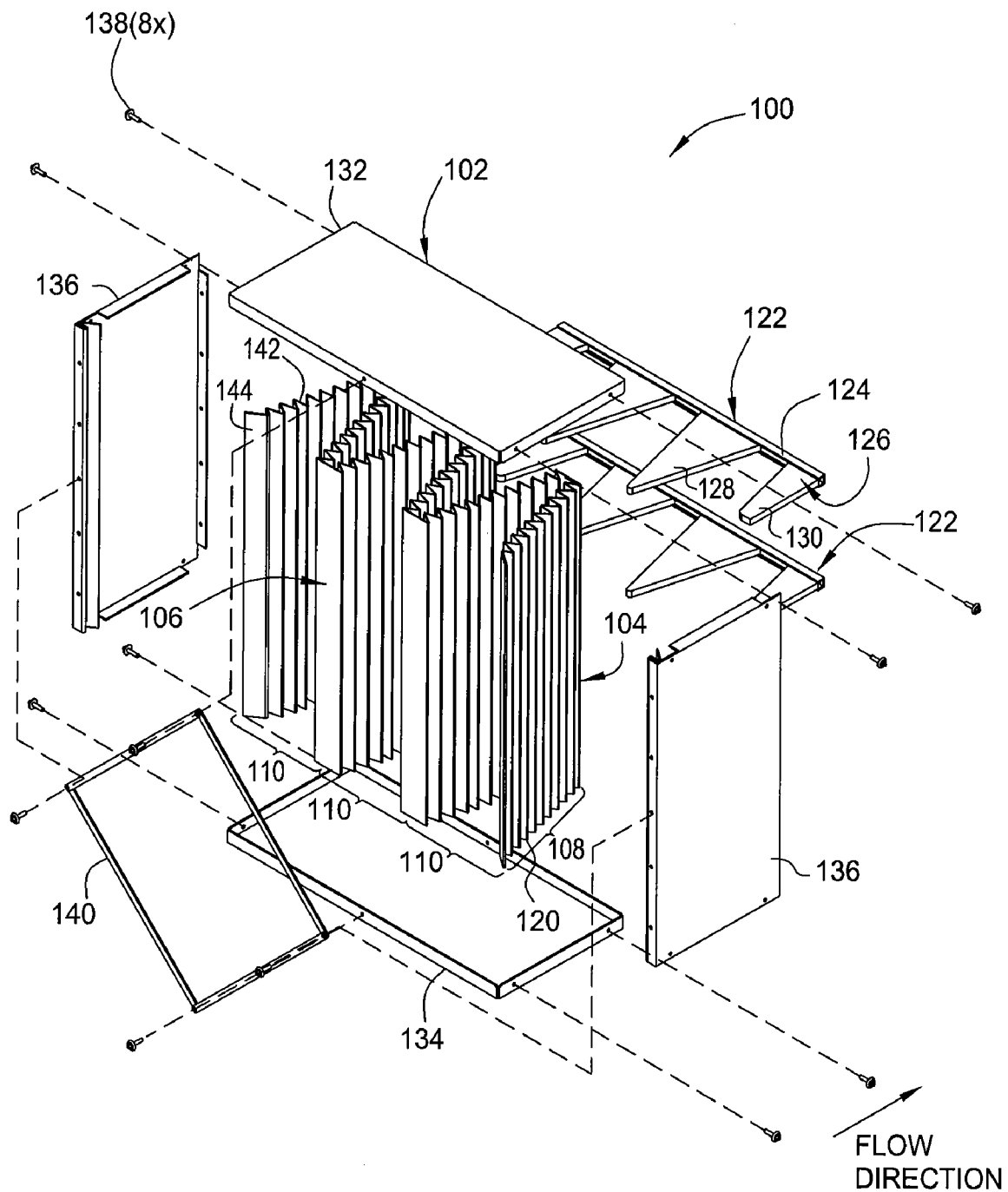

FIGS. 1A-B are front isometric and exploded views of one embodiment of an air filter assembly 100 of the present invention. Although the filter assembly 100 illustrated in FIGS. 1A-B incorporate a plurality of beneficial features, it is contemplated that the invention may be beneficially incorporated in other filter assemblies having different configurations.

In one embodiment, the filter assembly 100 includes a frame assembly 102 and a media pack 104. The media pack 104 is coupled to the frame assembly 102 such that substantially all of the air passing through the filter assembly 100 will pass through the media pack 104.

The media pack 104 is fabricated from a continuous, uninterrupted sheet of filter media 106 having both backs of mini-pleated regions 108 arranged in a non linear orientation, for example, in one or more macropleats, or v-banks 110, advantageously providing both economy of fabrication and high media area for efficient filtration. The use of a single media pack 104 in the filter assembly 100 fabricated from a single continuous, uninterrupted sheet of filter media 106 eliminates the labor, materials and logistics associated with cutting, storing, assembling and sealing multiple media packs into a single filter element.

Figure 1C:
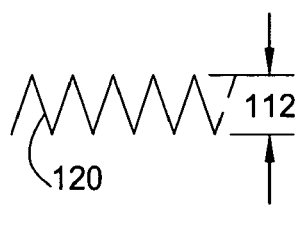
FIG. 1C is a top view of a mini-pleat region of a filter media according to one embodiment of an air filter of the present invention.

The filter media 106 in the minipleated regions 108 is generally folded in an accordion-like manner to form a plurality of minipleats 120. The minipleats 120 may have a pleat height 112 of about 1 to about 3 inches, and a minipleat density of about 0.75 to about 1.5 pleats per inch (as shown in FIG. 1C). The minipleat pleats 120 may optionally have minipleat separators (not shown) disposed on one or more sides of the pleats 120. The minipleat separators may be thread, ribbon or hot melt, as known in the art.

Figure 1D:
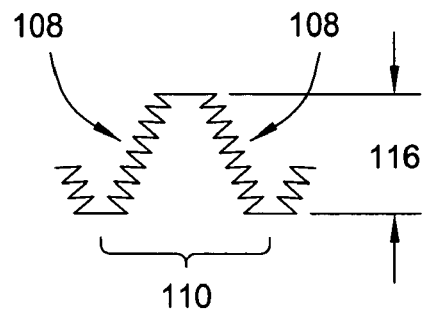
FIG. 1D is a top view of a v-bank section of a filter media according to one embodiment of an air filter of the present invention.

Adjacent minipleated regions 108 are also folded in an accordion-like manner to define each v-bank 110. The v-banks 110 may have a pleat height 116 of about 5.0 to about 15.0 inches. The v-banks 110 may have a density of about 0.16 to about 0.33 v-banks per inch (as shown in FIG. 1D). The edges of the minipleated region 108 and v-banks 110 having the accordion like folds that are generally referred to as open edges 142, while the opposing short ends of the media pack 104 are generally referred to as the flat edge 144. It is contemplated that other v-bank configurations may be utilized. In the embodiment depicted in FIGS. 1A-1B, the media pack 104 has two v-banks 110. Other common configurations include one or two v-banks 110, although other configurations are contemplated.

A bank separator 122 may be disposed between the minipleat regions 108 forming the v-banks 110. The bank separators 122 may be disposed on the upstream and/or downstream side of the filter assembly 100. In the embodiment depicted in FIGS. 1A-B, two bank separators 122 are shown on the downstream side of the filter assembly 100 with no bank separators utilized on the upstream side.

The bank separator 122 generally includes a channel 124 and a finger form 126. The channel 124 couples the finger form 126 to the frame assembly 102. The finger form 126 generally includes a plurality of center fingers 128 and edge fingers 130. The center fingers 128 extend from the channel 124 between facing sides of adjacent minipleated regions 108. The edge fingers 130 are shorter than the center fingers 128 and extend from the channel 124 between the frame assembly 102 and the adjacent minipleated region 108.

Figure 2:
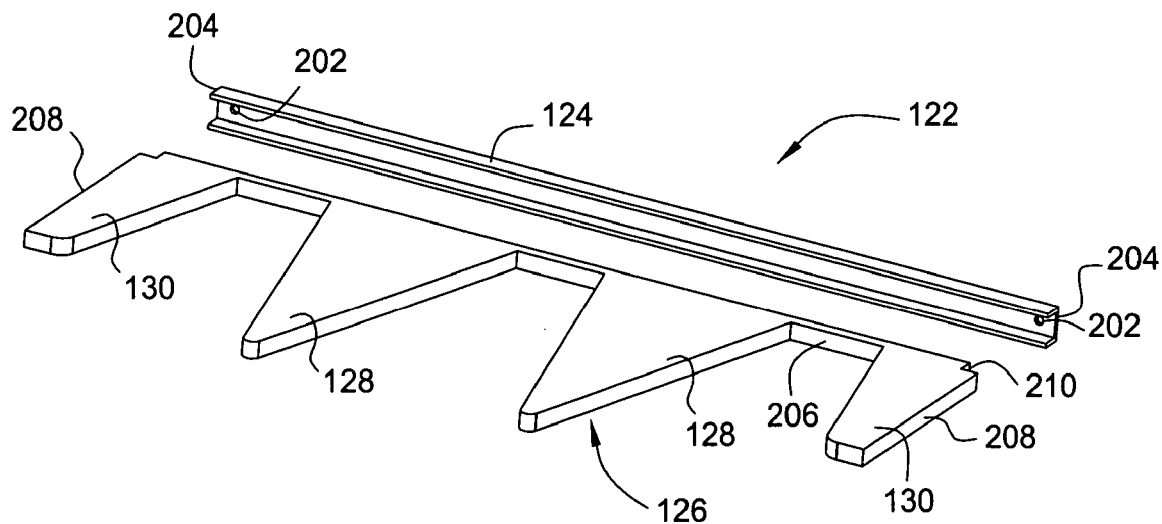
FIG. 2 is an isometric view of one embodiment of a vent separator.

FIG. 2 depicts an exploded isometric view of one embodiment of the bank separator 122. The channel 124 has a c-sectional form and may be fabricated from metal, glass reinforced plastic (FRP) or other suitable material. A hole 202 is provided in each end 204 of the channel 124 to facilitate coupling the channel 124 to the frame assembly 102, for example, by a fastener, such as a rivet or screw.

The finger form 126 is generally fabricated from metal, cardboard, wood, chipboard, paperboard, FRP, plastic or other suitable material. A base 206 of the finger form 126 is sized to slide into and be retained by the channel 126. The center and edge fingers 128, 130 may be fabricated with the base 206 as a one-piece assembly, for example, by stamping from a single blank stock of material.

In one embodiment, the finger form 126 has a length substantially equal to that of the channel 126. Upon assembly, edges 208 of the finger form 126 align with the ends 204 of the channel 124, thereby orientating the fingers 128, 130 along the channel 126 in a predetermined position. Although the edge 208 is shown on the base 206, the edge 208 may additionally or alternatively be defined by the outside of the edge fingers 130.

A notch 210 is formed in at least one of the edge fingers 130 or base 206 on the side of the finger form 126 facing away from the fingers 128, 130. The notch 210 is aligned with the hole 202 formed in the channel 124. The notch 210 provides clearance for the fastener passing through the hole 202 utilized to secure the channel 126 of bank separator 122 to the frame assembly 102 without disturbing the positioning of the finger form 126 relative to the channel 124.

Figure 3:
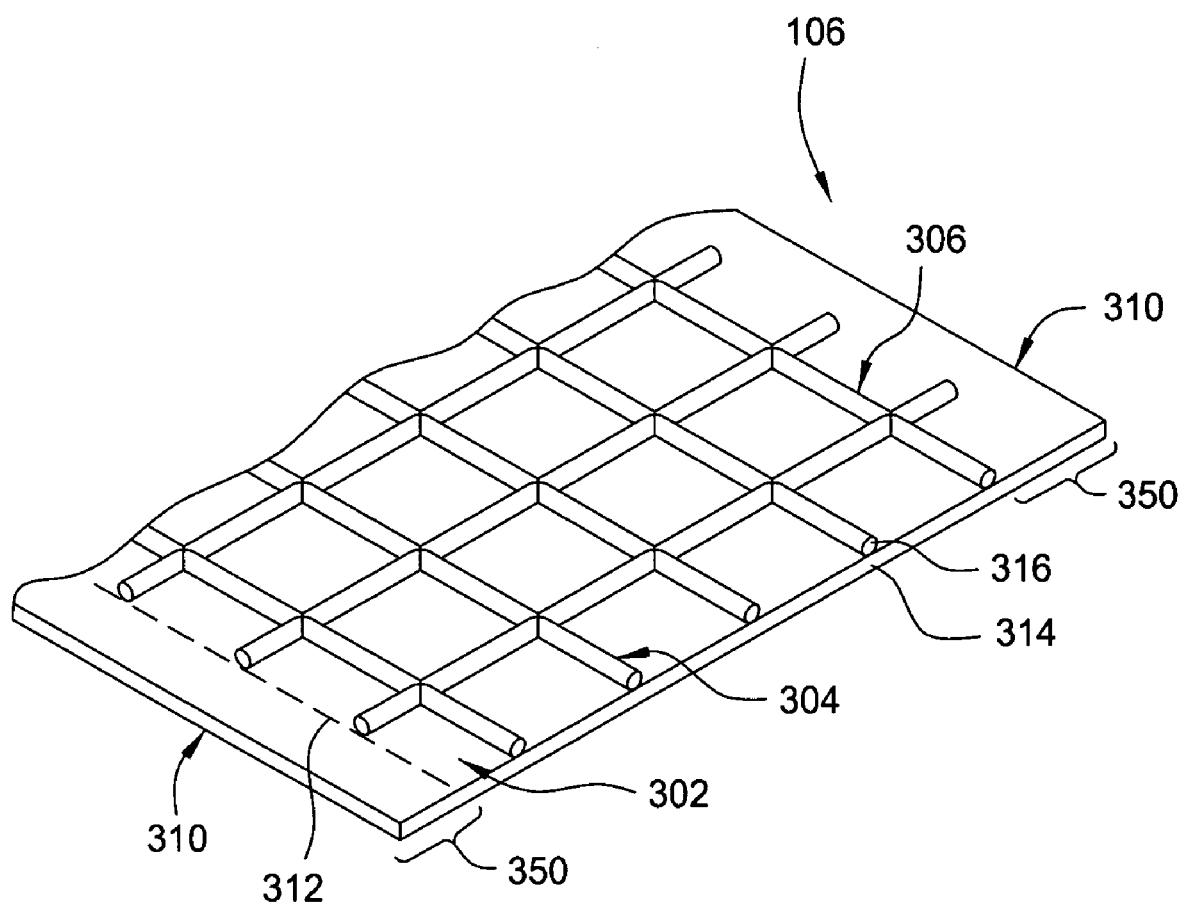
FIG. 3 depicts one embodiment of a filter media suitable for use in the filter of FIGS. 1A-B.

FIG. 3 depicts one embodiment of the filter media 106 suitable for using in the media pack 104. The filter media 106 generally has a stiffness suitable to substantially maintain the pleat configuration when subjected to air flow rates of at least about 88 feet per minute. Flow rates through the filter assembly 100 may range between, but are not limited to, about 750 to about 3000 cubic feet per minute. In one embodiment, the filter media 106 has a filtering layer 302 and a backing layer 304. The filtering layer 302 may be fabricated from glass fiber, wet laid glass fiber, synthetic media, or organic material, such a cellulose or cotton, among others. The filtering layer 302 is generally selected to provide a predetermined filtering efficiency and pressure drop. The filtering layer 302 typically has, but is not limited to, an efficiency of up to about 95 percent DOP. In another embodiment, a filtering efficiency may be selected in the range of about 9 to about 14 MERV, such as about 10 to about 13 MERV. It is contemplated that media providing either higher or lower filtering efficiencies may be utilized.

The backing layer 304 provides support to the filtering layer 302 and is typically located on the downstream side of the filtering layer 302. The backing layer 304 may be a mesh, mat, perforated, expanded or other material suitable for supporting the filtering layer 302 without detrimentally increasing the pressure drop across the media 106. The backing layer 304 may be fabricated from a metal, polymeric or other suitable material. In the embodiment depicted in FIG. 3, the backing layer 304 is a wire mesh 306. In yet another embodiment, the wire mesh 306 is fabricated from copper clad wire arranged in a square grid having one inch welded centers. Although the backing layer 304 may be bent sharply at the apex of the minipleats, a minipleat fold radius between pleats 120 in the minipleat region 108 is generally maintained at a radius of at least about 0.090 inches to ensure the filtering layer 302 is not sharply bent in a manner that could potentially leakage and/or lead to shedding of the filtering media.

In one embodiment, a width of the filtering layer 302 is generally greater than the width of the backing layer 304. As such, a lateral edge 310 of the filtering layer 302 extends beyond a lateral edge (shown as dashed line 312) of the backing layer 304 to define an unsupported edge region 350 of the filtering layer 304. This allows the unsupported edge region 350, located along the open edge 142 of the filtering layer 302 after pleating, to be folded or otherwise deformed upon assembly with the frame assembly 102 (as further discussed below). Respective terminal ends 314, 316 of the filtering and backing layers 302, 304 are generally aligned and are located along the first edge 144 after pleating.

Referring primarily to FIGS. 1A-B, the frame assembly 102 generally has a quadrilateral form, such as square or rectangular. In one embodiment, the frame assembly 102 includes top and bottom panels 132, 134 coupled to side panels 136. The panels 132, 134, 136 may be fabricated from metal, coated steel, galvanized steel, plastic, wood or wood product such as fiber board, cardboard, chip board and the like, FRP or other suitable material. The panels 132, 134, 136 may be coupled by any suitable method, for example, by clips, screws, rivets, welding, snap-fit, adhesive and tape, among others. In the embodiment depicted in FIGS. 1A-B, a plurality of rivets 138 are utilized to couple the panels 132, 134, 136. A plurality of braces 140 may optionally be coupled between the panels 132, 134, 136 to rigidize the frame assembly 102. Although FIGS. 1A-B depict the panels 132, 134, 136 as separately fabricated components, it is contemplated that two or more, or even all of the panels 132, 134, 136, may be fabricated from a single blank of base material or be a molded assembly.

Figure 4:
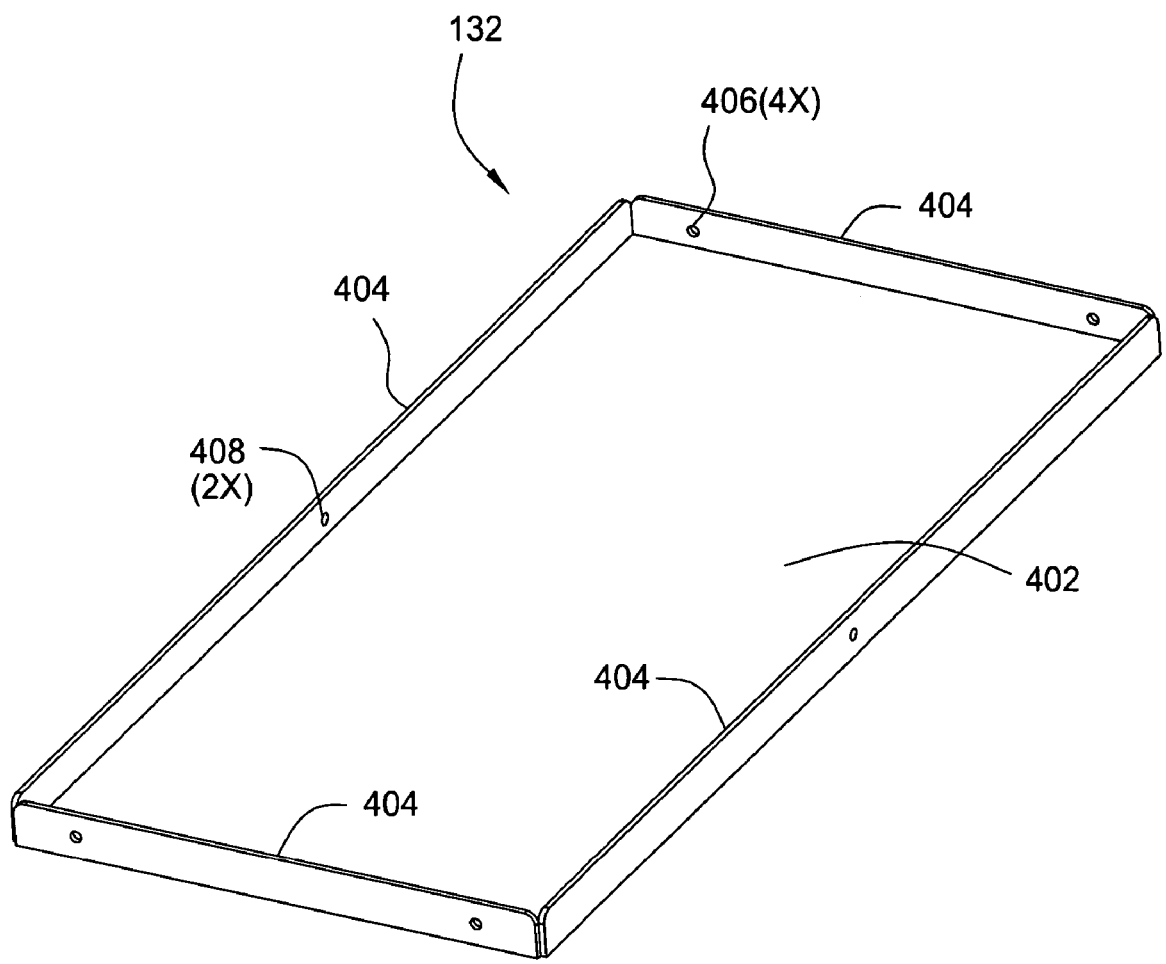
FIG. 4 is a bottom isometric view of a top panel of the filter of FIGS. 1A-B.

FIG. 4 depicts an isometric view of one embodiment of the top panel 132. The bottom panel 134 may be similarly constructed. The top panel 132 generally includes a wall 402 having a plurality of flanges 404 extending therefrom. The flanges 404 include a plurality of panel mounting holes 406 for accepting the rivet 138 utilized to secure the top panel 132 to the side panels 136. Each of the flanges 404 may optionally include appropriate brace mounting holes 408 to facilitate coupling braces 140 between the panels 132, 136. In one embodiment, the top panel 132 is fabricated from sheet metal.

Figure 5A:
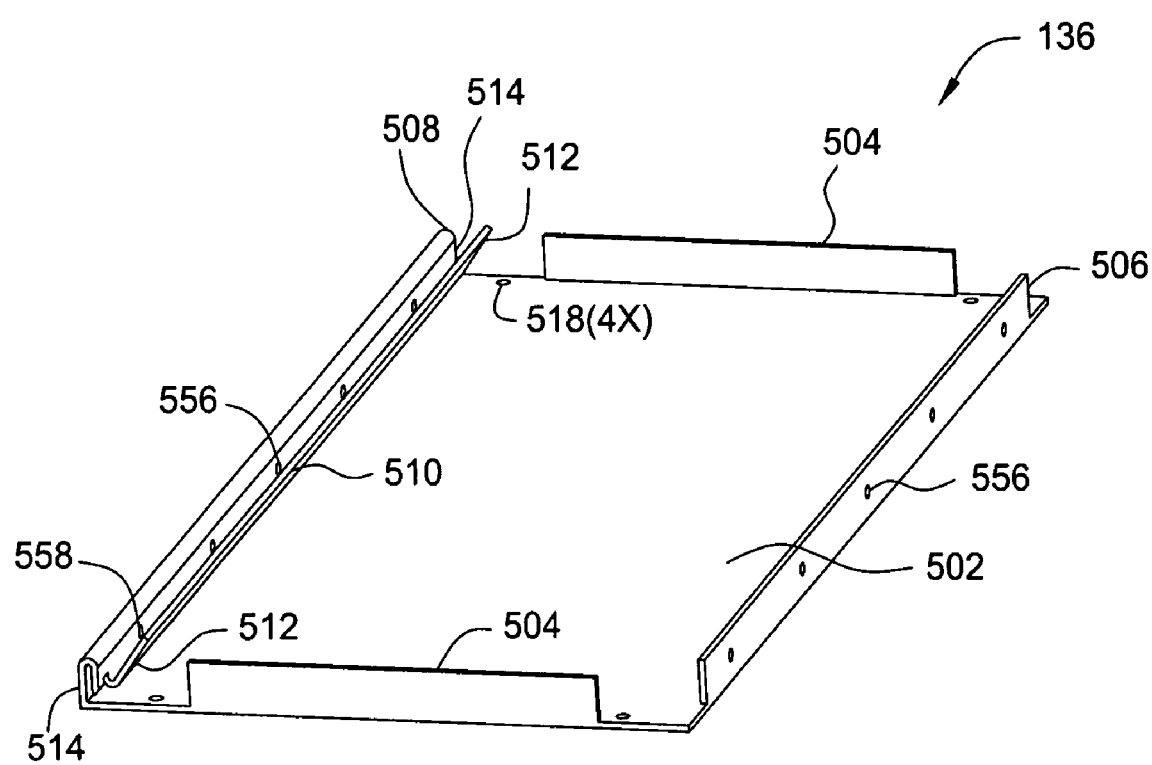
FIGS. 5A-C are isometric, sectional and partial side views of one embodiment of a side panel.
Figure 5B:
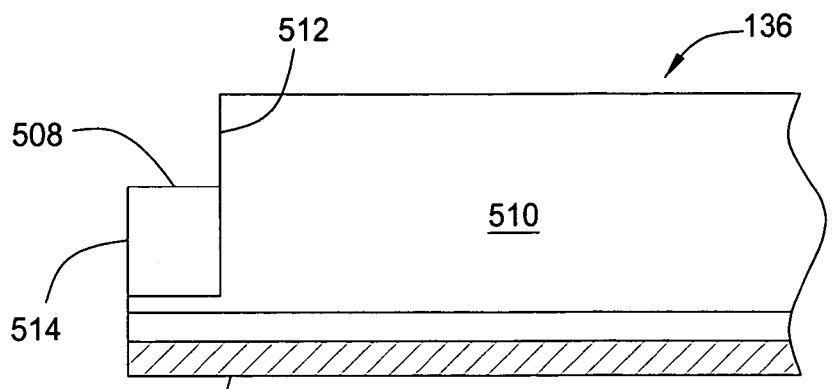
Figure 5C:
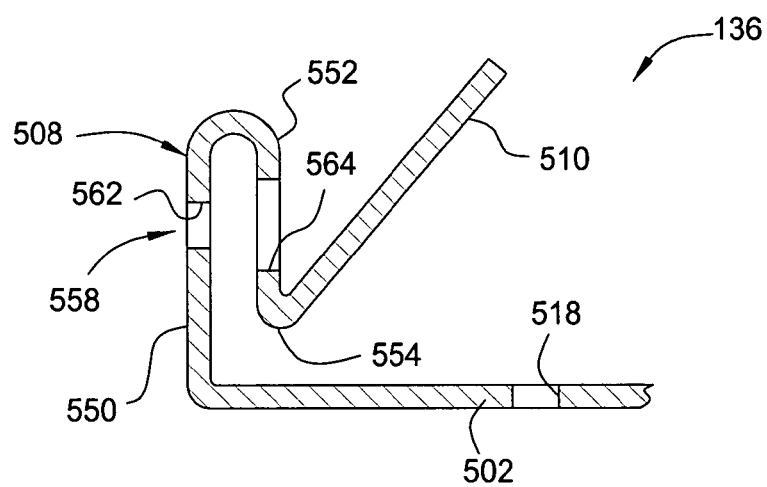

FIGS. 5A-C are isometric, sectional and partial side views of one embodiment of the side panel 136. The side panel 136 generally includes a wall 502 having opposing end flanges 504, a downstream flange 506 and an upstream flange 508 extending therefrom. The wall 502 includes a plurality of panel mounting holes 518 for accepting the rivet 138 utilized to secure the side panels 136 to the top and bottom panels 132, 134. Each of the flanges 506, 508 may optionally include appropriate brace mounting holes 556 for facilitating coupling braces 140 between the panels 132, 134, 136. The flanges 506, 508 may optionally include additional holes 558 for securing the filter assembly 100 to a holding flange, second filter or other object. In one embodiment, the top panel 132 is fabricated from sheet metal.

An anchor tab 510 is provided adjacent the upstream flange 508. The anchor tab 510 provides a surface for attaching the flat edge 144 of the media pack 104 to the frame assembly 102. The anchor tab 510 extends inward relative to the wall 502 and away from the upstream flange 508. The anchor tab 510 is spaced from the upstream flange 508 a distance of about 0.25 to about 10 inches, thereby spacing the media pack 104 from the wall 502. The spacing of the media pack 104 from the wall 504 enhances air flow and reduces pressure drop by providing adequate open area between the media pack 104 and wall 502 proximate the upstream flange 508 so that the proximity of the pack 104 to the wall 502 does not restrict the flow of air in that area.

The anchor tab 510 may be orientated between zero to about 90 degrees relative to the upstream flange 508. In one embodiment, the anchor tab 510 is orientated between 30 to about 60 degrees relative to the upstream flange 508. From another reference point, the orientation of the anchor tab 510 is between about parallel to about perpendicular relative to the wall 502. In one embodiment, the anchor tab 510 is orientated between 30 to about 60 degrees relative to the wall 502. In the embodiment, the anchor tab 510 extends further away from the wall 502 than the upstream flange 508. In the embodiment depicted in FIGS. 5A-C, the anchor tab 510 extends at least about 1.0 inch from the wall 502, although shorter lengths may alternatively be used.

Figure 6:
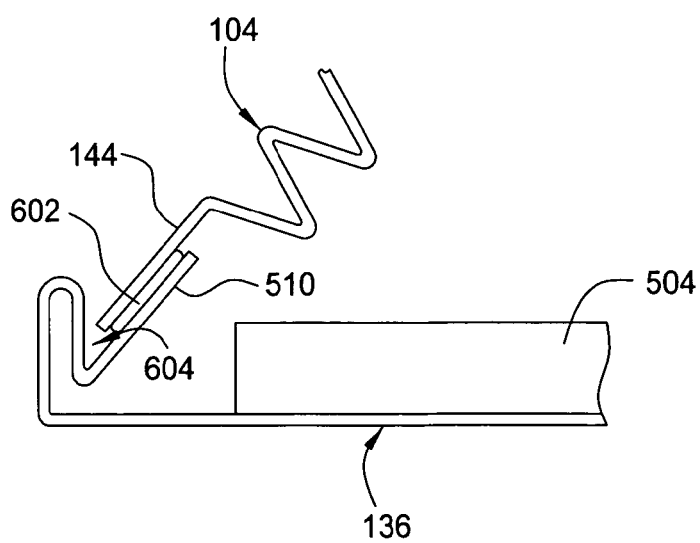
FIG. 6 is a partial sectional view of the side panel of FIGS. 5A-C.

FIG. 6 is a sectional view of the side panel 136 illustrating the attachment of the media pack 104 to the anchor tab 510. The flat edge 144 of the media pack 104 is coupled to the anchor tab 510 by an adhesive 602. The adhesive 602 may be a pressure sensitive adhesive, a double sided tape, a silicone adhesive, a polyurethane adhesive or other suitable adhesive. In the embodiment depicted in FIG. 6, the adhesive 602 is a hot melt. The adhesive 602 may be disposed along the anchor tab 510 in a substantially uninterrupted bead, covering the entire length, or intermittently.

Alternatively, the flat edge 144 of the media pack 104 may be potted or adhered in a trough 604 defined between the anchor tab 510 and the upstream flange 508. In yet another alternative embodiment, the flat edge 144 of the media pack 104 may be clamped between the anchor tab 510 and the wall 502, or secured to the side panel 136 using a spring clip.

Referring back to FIGS. 5A-5C, the length of the anchor tab 510 is generally less than a length of the upstream flange 508. As illustrated in FIG. 5B, an end 512 of the anchor tab 510 is offset inward from an end 514 of the upstream flange 508 relative to the end flanges 504. The recessed ends 512 of the anchor tab 510 is thus maintained spaced-apart from the walls 402 of the top and bottom panels 132, 134, thereby providing clearance for the open end 142 of the media pack 104 to sealingly engage the top and bottom panels 132, 134 as described with reference to FIG. 7A.

The anchor tab 510 may be part of, or coupled to the side panel 136. In one embodiment, the anchor tab 510 is fabricated from the portion of the side panel 136 forming the upstream flange 508. For example, in the embodiment depicted in FIG. 5C, the upstream flange 508 includes an outer wall 550 and an inner wall 552. The outer wall 550 is coupled along a first side to the wall 502. The second side of the outer wall 550 terminates at a fold, which beings the inner wall 552. The inner wall 552 extends back towards the wall 502 to a bend 554. The anchor tab 510 extends back away from the inner wall 552 and wall 502 as discussed above.

The holes 556, 558 formed through the upstream flange 508 include a first hole 562 formed through the outerwall 550 and a second hole 564 formed through the inner wall 564. The second hole 564 is typically larger in diameter than the first hole 562 to ensure alignment between the holes 562, 564 forming the hole 556 for the rivet or other fastener securing the braces 140 and/or bank separators 122. The angle of the anchor tab 510 (and/or spacing of the anchor tab 510 provided by the bend 554/trough 602) allows the insertion of a fastener through the holes 552, 558 without obstruction.

Figure 7A:
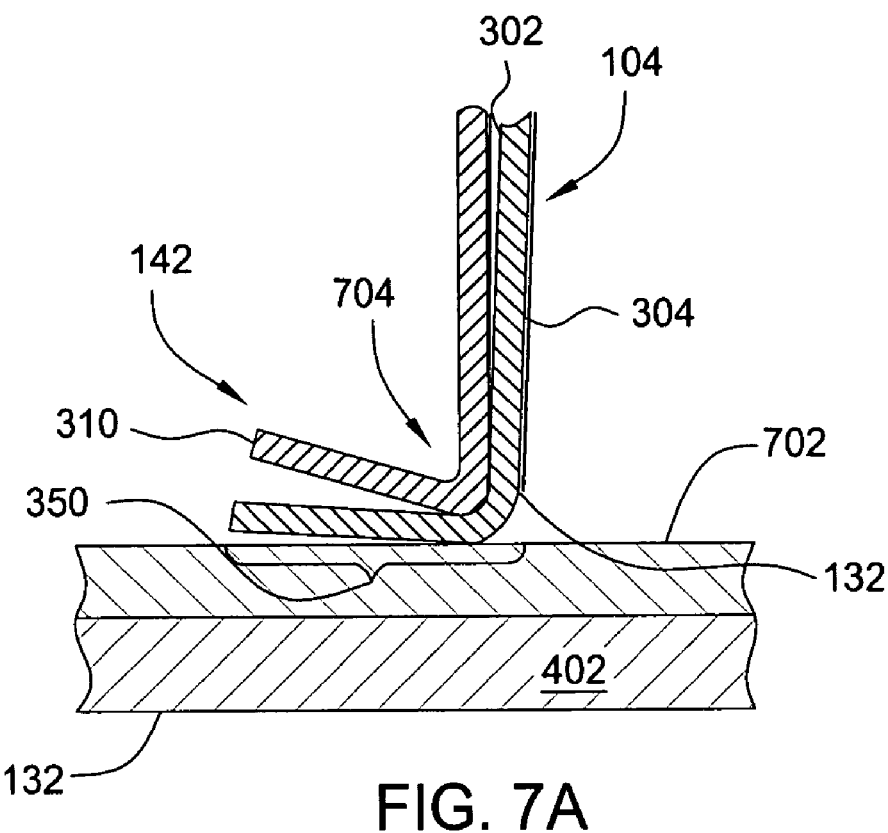
FIGS. 7A-B are partial sectional views of the media pack adhered to the top panel in alternative configurations.

FIG. 7A is a partial sectional view of the media pack 104 adhered to the top panel 132. The media pack 104 is adhered to the bottom panel 134 in a similar manner. The open end 142 of the media pack 104 is sealed to the top panel 132 using an adhesive 702. As with the sealing of the flat end 144 of the media pack 104 to the side panel 136, the method of how the adhesive is utilized will depend on the amount of bypass leakage permissible under the specification under which the filter assembly 100 is built and/or tested.

In one embodiment, the adhesive 702 substantially covers the inner surface of the wall 402. The adhesive 702 may be a polymer-based adhesive, a water soluble paste, a hot melt adhesive, or other suitable adhesive. In the embodiment depicted in FIG. 7A, the adhesive 702 is a pressure sensitive hot melt adhesive, such as Semi-crystalline adhesives, polyolefin-based adhesives, polyimide-based adhesives, modified EVA adhesives and (APAO) amorphous polyolefins. Other suitable adhesives include (SIS) styrene isoprene styrene, rubber-based adhesives and acrylic-based adhesives, among others. Other suitable adhesives may be water-based pastes, including thixotropic, paste and liquid adhesive systems. Additional adhesives may be mastics, caulks and the like, including latex, silicone, polyurethane, pitel and tar, among others. The adhesive may alternatively be a two component or reacted thermoset material, such as epoxy, polyurethane, or a heat-cured material, such as plastisols. The adhesive may also be a solvent or water-based contact cement, rubber cement and the like. As the top panel 132 is secured to the side panel 136, the wall 502 is urged against the unsupported edge region 350 of the media pack 104, creating a fold 704. The fold 704 substantially prevents air flowing through the filter assembly 100 from leaking between the media pack 104 and side panel 136 through the open end 142.

In one embodiment, the adhesive 702 is a pressure sensitive repositionable adhesive containing an oily component resulting in a tacky material with a relatively long open time (approximately one minute) and an aggressive bond that allows the open end 142 to be adjusted (i.e., repositioned) relative to the wall 402. Repositionable adhesives generally have an open time (e.g., time in which good bonding will occur) of at least about 10 seconds. The open time may exceed about 1 minute, or be indefinite.

The use of a repositionable adhesive is beneficial in that the orientation between opposing minipleated regions 108 forming the v-banks 140 may be set with greater position. It has been demonstrated that a symmetric and uniform orientation of the v-banks 140 enhances airflow uniformity through the filter assembly, and thus, minimizes the pressure drop across the filter assembly during operation. For example, the filter assembly 100 with uniform bank spacing has a resistance of about 0.49 inches water gage (in. wg.) as compared to a resistance of about 0.58 in. wg. for a similar filter fabricated with non-repositional adhesives which resulted in non-uniform bank spacing.

In another embodiment, the adhesive 702 has a high tack that is sufficient to anchor the media pack 104 to the side panels 136 over the course of normal operations. The adhesive 702 may have a moderate to aggressive tack, and may bond substantially instantaneously to the media pack 104. Suitable adhesives may be of the type that exhibit excellent adhesion to a wide variety of materials, including the media pack 104 and the frame material.

Figure 7B:
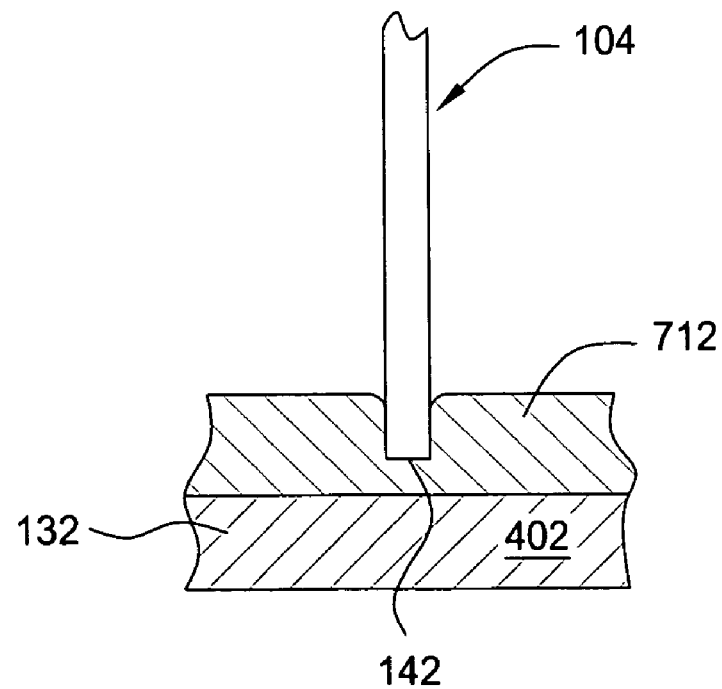

FIG. 7B is another partial sectional view of the media pack 104 adhered to the top panel 132. Here, the open end 142 of the media pack 104 is also sealed to the top panel 132 using an adhesive 712 having a sufficient depth to allow the open end 142 to penetrate the adhesive 712. Thus, in this embodiment, the seal between the media 106 and the adhesive 712 provides the primary barrier to air leakage.

Figure 8A:
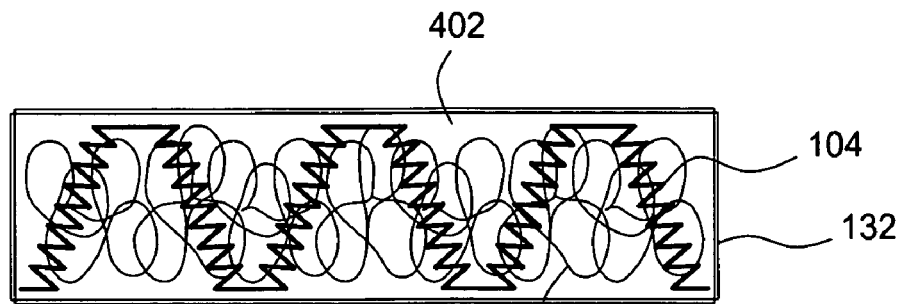
FIGS. 8A-B are sectional and top views of another embodiment of the media pack adhered to the top panel.
Figure 8B:
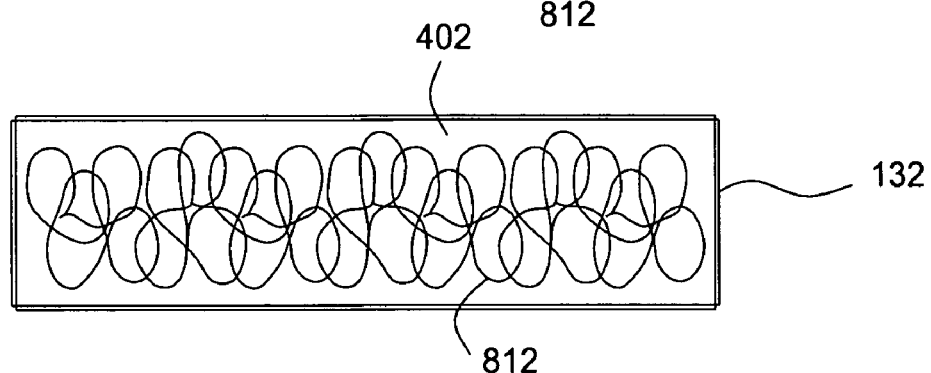

FIG. 8A-B are sectional and top views of another embodiment of the media pack 104 adhered to the top panel 132. An adhesive 812 is disposed on the wall 402 in a discontinuous configuration, for example, by utilizing a spray or swirl pattern such that the adhesive 812 does not continuously cover the wall 402. The swirl pattern may be described as one or more elongated adhesive beads or strings. The swirl pattern may have a random, wave, oscillating, a swirl or other pattern across the wall 402. The swirl pattern may also have adhesive regions touching and spaced from each other. In one embodiment, the adhesive 812 is a hot melt suitable for use with a swirl gun, such as hot melt adhesives described above with reference to adhesive 712. The adhesive 812 applied to the wall 402 in a swirl pattern using a hot melt swirl spray gun, available from Nordson Corporation, located in Westlake, Ohio. As the swirled adhesive 812 does not completely cover the wall 402, less than about 50 grams/square foot of adhesive may be utilized to effectively secure the media pack 104 to the wall 402, as compared to about 70 grams/square foot in conventional applications. In another embodiment, less than about 20 grams/square foot of adhesive may be utilized to effectively secure the media pack 104. It is contemplated that the grams/square foot of adhesive utilized may be further reduced by foaming the adhesive. It is further contemplated that other adhesive systems, such as two component or reacted systems, epoxies, polyurethanes, thirstropic, caulk or other adhesive may be utilized in a swirl or other pattern that minimizes adhesive use while suitably bonding the media pack to the wall 402.

Figure 9A:
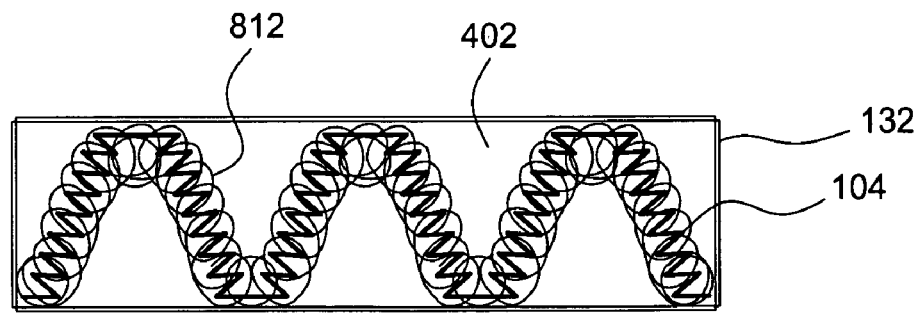
FIGS. 9A-B are sectional and top views of another embodiment of the media pack adhered to the top panel.
Figure 9B:
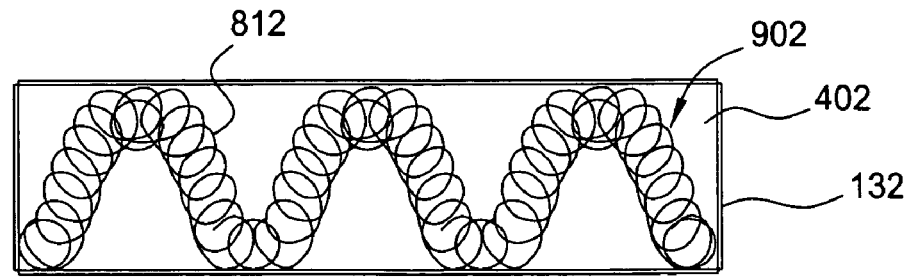

FIGS. 9A-B are sectional and top views of another embodiment of the media pack 104 adhered to the top panel 132. The adhesive 812 is disposed in an accordion-like or zig-zag manner such that a patter 902 of adhesive disposed on the wall 402 is substantially aligned with the v-banks 110 of the media pack 104. It is contemplated that continuous layer (i.e., not swirled) of a non-flowing adhesive may be utilized.

Figure 10:
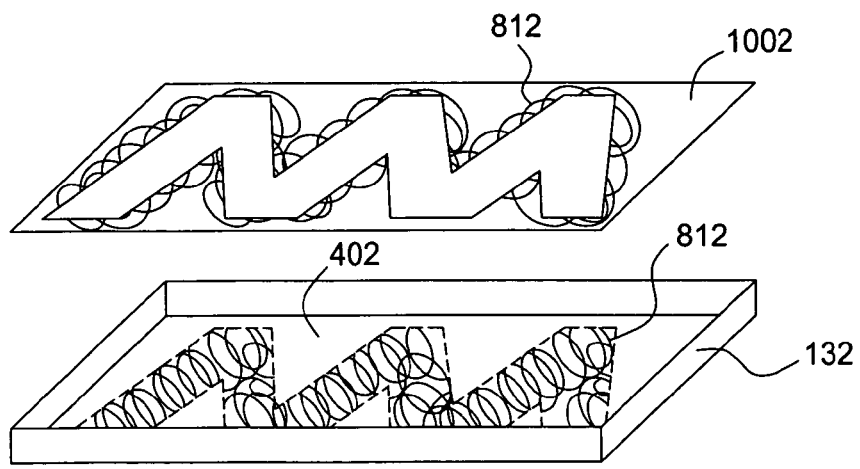
FIG. 10 is another embodiment of a media pack adhered to a top panel.

In one embodiment, the adhesive 802 may be applied using a mask 1002, as shown in FIG. 10. The mask 1002 may be used as a guide or pattern to direct the motion of the spray gun. Alternatively, the mask 1002 may be used as a stencil. The mask 1002 may be a polymeric material, such as polyethylene, which does not adhere to the adhesive 802. Thus, the adhesive overspray 1004 disposed on the mask 1002 may be periodically peeled off, re-melted and re-sprayed onto the wall 402.

Figure 11:
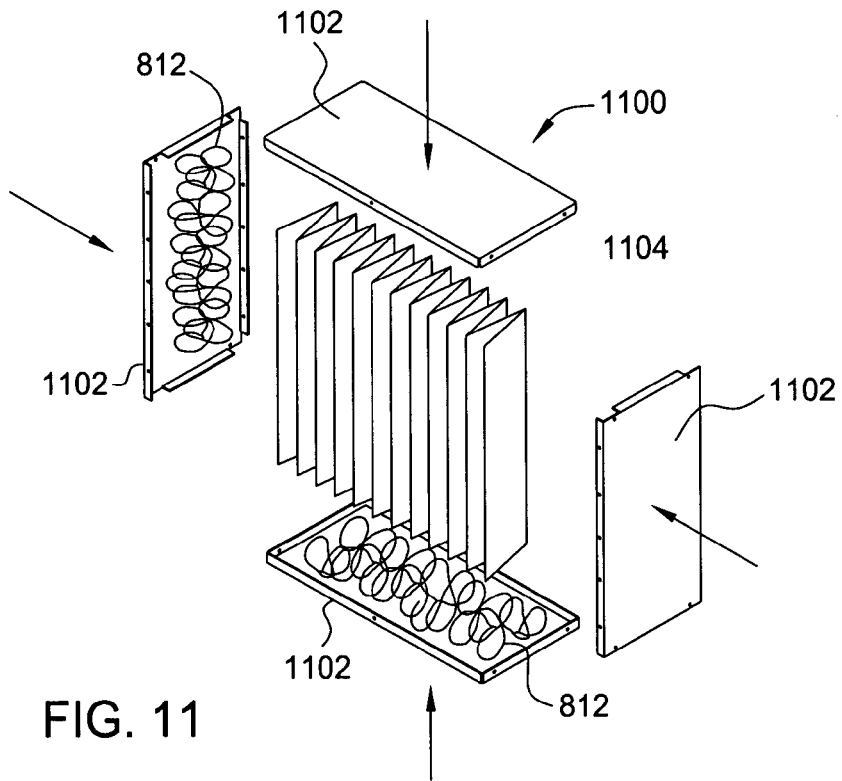
FIG. 11 is an exploded view of a conventionally-pleated media pack of a filter having a conventionally-pleated media pack sealed to a frame using a swirled adhesive.
Figure 12:
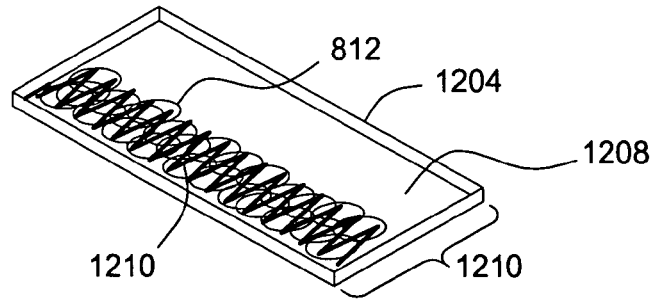
FIG. 12 is another embodiment of a filter having a conventionally-pleated media pack sealed to a housing with a swirled adhesive.
Figure 13:
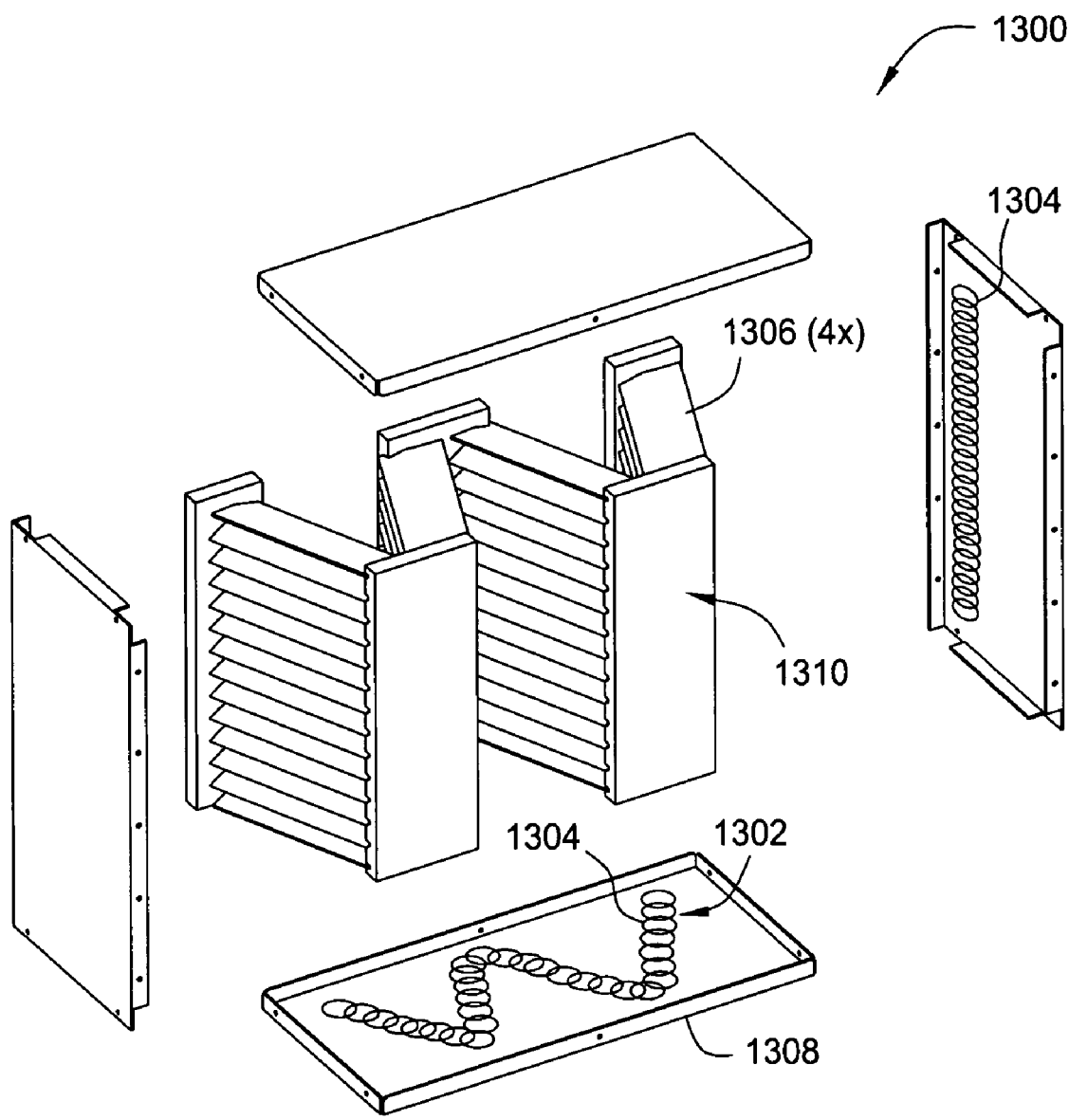
FIG. 13 is another embodiment of the filter having a swirled adhesive utilized to seal a plurality of filter banks.

It is noted that utilizing the spray adhesive and/or masking the adhesive may be utilized to advantageously minimize the amount of adhesive in other filter applications. The spray adhesive may additionally be applied robotically to ensure uniform adhesive coverage. For example, swirl adhesive 1102 may be applied to a frame 1104 to seal a conventionally pleated media pack 1106 in the fabrication of a panel filter 1100, as shown in FIG. 11. In another embodiment, swirl adhesive 1202 may be applied to a flat portion 1208 of a frame 1204 to form a strip 1206 that is narrower than the width of the flat portion 1208. The width of the strip 1206 is selected to adequately seal a conventionally pleated media pack 1210 in the fabrication of a panel filter 1200, as shown in FIG. 12. The strip 1206 may be applied using a mask, as discussed above. In another embodiment, a strip 1302 of adhesive 1304 may be applied on a frame 1308 in a zig-zag pattern to seal a plurality of filter banks 1306 arranged in a v-bank configuration 1310 in the fabrication of a v-bank filter 1300, as shown in FIG. 13.

Figure 14:
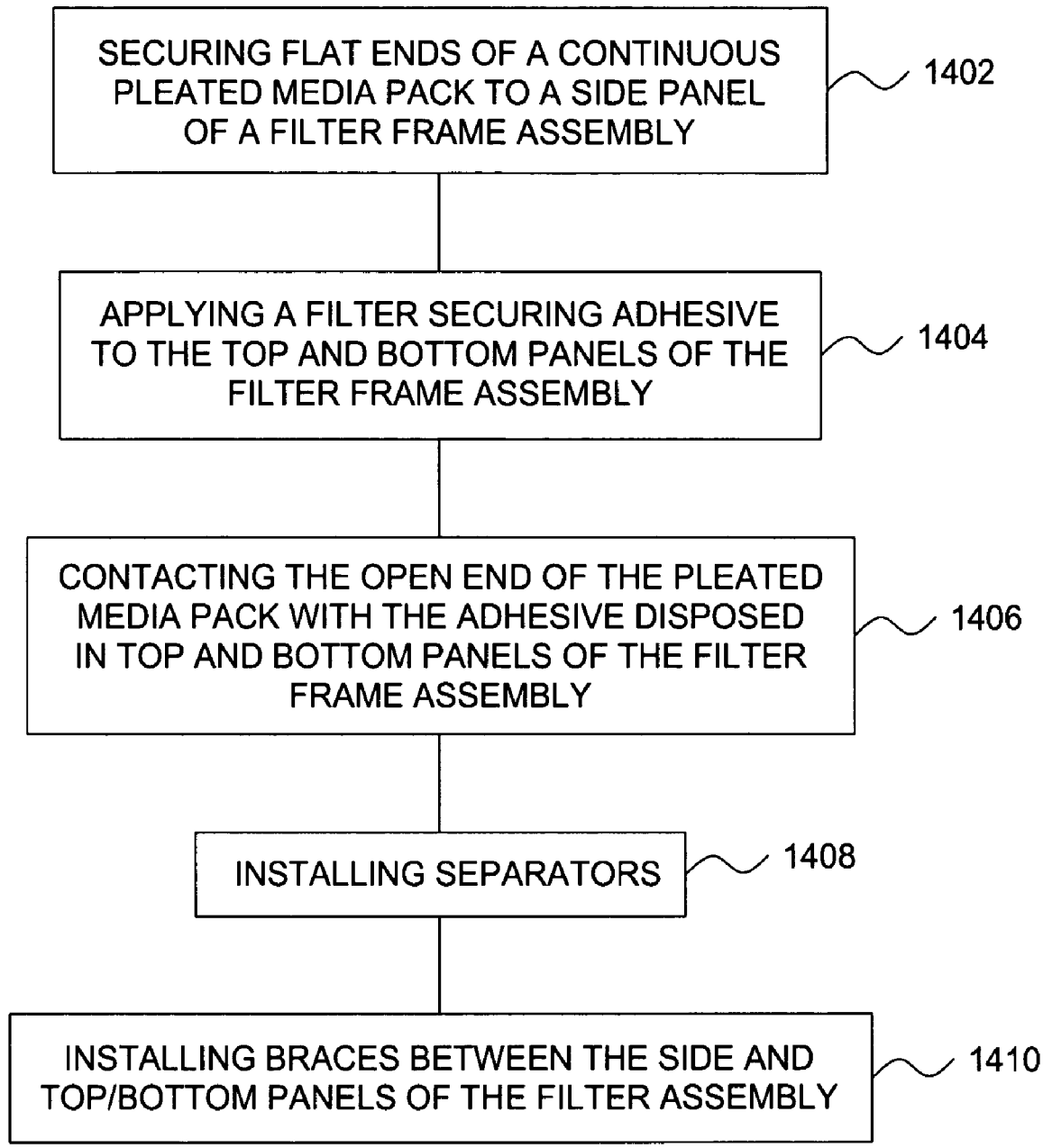
FIG. 14 is a flow diagram of one embodiment of a method for fabricating an air filter.

FIG. 14 is one embodiment of a method 1400 for making filter assembly. The method 1400 begins at step 1402 by securing the flat ends of a continuous pleated media pack to a side panel of a filter frame assembly. In one embodiment, the flat ends by be secured to an anchor tab extending from the panel using a lap joint using a hot melt or other suitable adhesive.

At step 1404, a filter securing adhesive is applied to the top and bottom panels of the filter frame assembly. In one embodiment, the adhesive may be disposed across the entire area of the top and bottom panels. In another embodiment, the adhesive may be arranged one the top and bottom panels in an accordion configuration. In yet another embodiment, the adhesive is applied in an interrupted strip. In yet another embodiment, the adhesive is applied using a swirl gun to produce a swirled adhesive pattern. In still another embodiment, the adhesive is foamed. It is contemplated that the adhesive may be applied using any combination of the above configurations.

At step 1406, the open end of the pleated media pack is brought into contact with the adhesive disposed in top and bottom panels of the filter frame assembly. In one embodiment, the pleated media pack is arranged in an accordion configuration to define one or more v-banks prior to adhering to the top and bottom panels of the frame assembly. In another embodiment, the entire length of the pleated media pack is maintained in a linear relationship while adhered to the top and bottom panels.

At step 1408, the separators are installed. Braces are secured between the side and top/bottom panels at step 1410 to rigiditize the filter assembly.

Thus, a filter assembly has been provided that facilitates rapid assembly with minimal labor. Moreover, embodiment of the filter assembly described herein may be fabricated with less materials than conventional designs. Furthermore, the filter assembly of the present invention has demonstrated performance comparable to conventional designs, thus making the invention well positioned to address the needs of next generation filtration products.

Although various embodiments which incorporate the teachings of the present invention have been shown and described in detail herein, those skilled in the art can readily devise many other varied embodiments that still incorporate these teachings.

What is claimed is:

1. A filter assembly comprising:
   a frame assembly;
   a pleated media pack having an open edge and a flat edge, the open edge having accordion-like folds; and
   a layer of adhesive coupling at least the open edge of the media pack to the frame assembly, the adhesive layer further comprising:
   a plurality of elongated adhesive strings having regions touching and spaced from each other.

2. The filter assembly of claim 1, wherein an orientation of the media pack is substantially parallel to the frame assembly.

3. The filter assembly of claim 1, wherein the media pack is arranged in a V-bank configuration.

4. The filter assembly of claim 3, wherein the media pack is mini-pleated.

5. The filter assembly of claim 4, wherein the media pack having the V-bank configuration consists of a single web of media.

6. The filter assembly of claim 5, wherein the web of media further comprises:
   a filtering layer and a backing layer.

7. The filter assembly of claim 1, wherein the layer of adhesive is a hot melt.

8. The filter assembly of claim 1, wherein the flat edge of the media pack is coupled to the frame assembly with a lap joint, wherein the lap joint comprises an adhesive positioned between the flat edge of the media pack and a tab extending from frame assembly.

9. The filter assembly of claim 1, wherein the layer of adhesive disposed on the frame assembly forms at least one V-shaped pattern.

10. The filter assembly of claim 1, wherein the layer of adhesive is uncontained by side walls along a long edge of adhesive layer.

11. A filter assembly comprising:
    a frame assembly;
    a pleated media pack having an open edge and a flat edge, the open edge having accordion-like folds; and
    a swirled layer of adhesive coupling at least the open edge of the media pack to the frame assembly.

12. The filter assembly of claim 11, wherein the media pack further comprises:
    at least one mini-pleated region.

13. The filter assembly of claim 11, wherein the flat edge of the media pack is coupled to the frame assembly by a second layer of adhesive.

14. The filter assembly of claim 13, wherein the second layer of adhesive further comprises a hot melt.

15. The filter assembly of claim 12, wherein the flat edge of the media pack is coupled to the frame assembly by a second swirled adhesive layer.

16. The filter assembly of claim 11, wherein the first layer of adhesive has a weight of at least about 50 grams/square foot.

17. The filter assembly of claim 11, wherein the first layer of adhesive is at least partially foamed.

18. The filter assembly of claim 11, wherein the media pack is arranged in a V-bank configuration.

19. The filter assembly of claim 11, wherein the media pack is mini-pleated.

20. The filter assembly of claim 11, wherein the media pack has a V-bank configuration.

21. The filter assembly of claim 11, wherein the adhesive is at least one of APAO, SIS, modified EVA or rubber based.

* * * * *